UNITED STATES PATENT OFFICE.

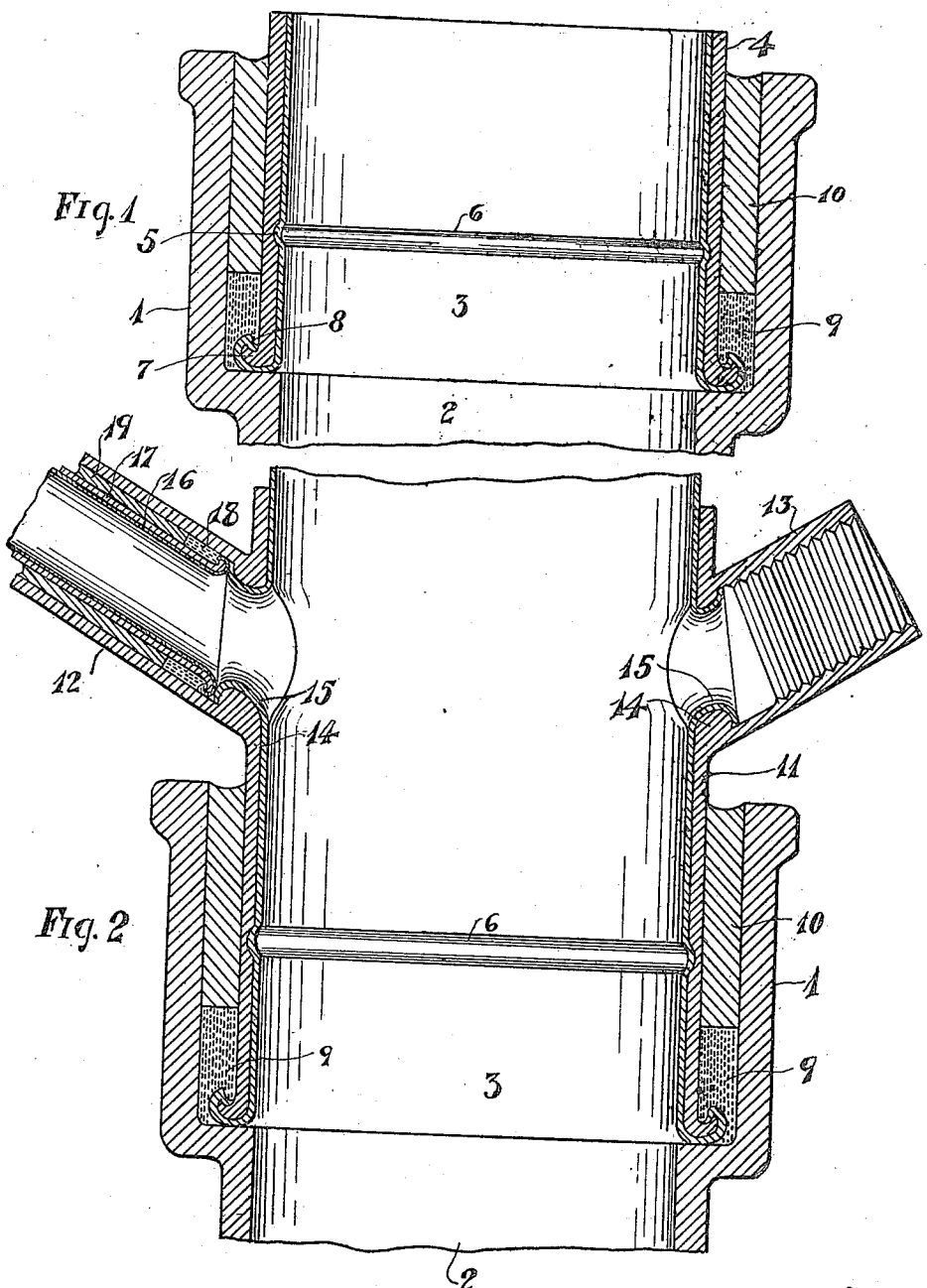

DAVID R. BURNS, OF PHILADELPHIA, PENNSYLVANIA.

PIPE-JOINT.

964,208.  Specification of Letters Patent.  Patented July 12, 1910.

Application filed July 1, 1909. Serial No. 505,353.

*To all whom it may concern:*

Be it known that I, DAVID R. BURNS, a citizen of the United States, residing at Philadelphia, in the county of Philadelphia and State of Pennsylvania, have invented certain new and useful Improvements in Pipe-Joints, of which the following is a specification.

My invention relates to an improved pipe joint, more particularly to an improved joint between a lead pipe and a pipe of hard metal, the object of the invention being to provide an improved joint of this character, which will most effectually connect a lead pipe with a hard metal pipe, such as a waste or sewer pipe, which will result in a perfectly tight joint, and one which renders practically impossible any disconnection or leakage at the joint.

Heretofore a great many different methods and structures have been devised for connecting lead pipe with sewer pipe and the like, all of which have proven more or less unsatisfactory in use, for the reason that the soft lead pipe will not hold its shape, but be bent or dented, so as to render it difficult to make a perfect and lasting joint, and to overcome the defects heretofore realized, my invention was devised, and will now be described in detail.

The invention consists in certain novel features of construction, and combinations and arrangements of parts as will be more fully hereinafter described and pointed out in the claim.

In the accompanying drawings, Figure 1, is a view in longitudinal section illustrating a simple juncture between a lead pipe and a waste pipe. Fig. 2, is a view illustrating a joint between a lead pipe and a plurality of pipes, where a number of pipes discharge into the sewer or drain pipe.

1 represents the ordinary cupped end of a sewer or waste pipe 2.

3 represents a lead pipe, and 4 a collar or nipple, which is preferably of brass, but may be made of various other metal.

The collar or nipple 4 is of an internal diameter to receive lead pipe 3, and is made with an internal annular groove 5, into which the lead pipe is hammered or pressed as shown at 6, to prevent any longitudinal movement of the collar on the lead pipe, or vice versa. The lower end of collar 4 is made with an external annular flange 7, preferably upturned slightly, as shown, and around this flange 7 the end of lead pipe 3 is hammered or bent as shown at 8, to effectually lock the end of the lead pipe around the flange, which lock will be a very effectual one, particularly when the end of the pipe is bent over the upper face of flange 7 as clearly shown. When the collar is thus in position around the lead pipe, and the lead pipe bent or hammered as above described, it is positioned within the cup 1, and oakum or other suitable packing 9 is forced into the collar on top of the flange 7, or rather against the inclosing portion 8 of pipe 3, and lead or solder 10 is filled in above the oakum 9 to form a perfectly tight joint. With a construction of this kind, it will be noted that the metal collar 4 acts as a rigid reinforcement for the end of the lead pipe 3, and prevents distortion of the lead pipe while being packed, and when once packed by the oakum, lead or solder, it will be practically impossible to disconnect the lead pipe without first removing the solder and the oakum.

In the joint shown in Fig. 2, the lead pipe 3 is positioned within a collar or nipple 11, of brass or other suitable material, and the juncture of the lead pipe with this collar at the lower end of the collar and pipe is precisely the same as that above described. In addition, however, this collar 11 is provided with integral tubes or offset pipes 12 and 13 respectively, and the lead pipe 3, at the openings in collar 11 registering with said tubes or pipes 12 and 13, is punched out and bent around internal enlargements 14 as shown at 15. These offset pipes 12 and 13 are of course provided only with the larger sizes of pipe, and by means of a suitable tool inserted within the lead pipe 3, the metal opposite the openings communicating with branch pipes 12 and 13, is punched out into the pipes 12 and 13 and then by means of suitable tools pressed around in conformity to the shape of that portion of the pipes at their juncture with the collar 11. In pipe 12, a smaller lead pipe 16 is secured by means of a collar 17, of brass or other suitable material, and by a packing of oakum 18 and lead 19, all of which is precisely the same in construction, as the joint in Fig. 1 above described, except that the end of the lead pipe is held tightly against the outwardly bent portion 15 of lead pipe 3, so as to form a tight juncture between them. The other offset pipe 13 is internally screw threaded to receive a hard metal pipe not shown.

A great many other variations might be resorted to in the form of the collar and pipe joints connected therewith, to conform to the plan of the plumbing without departing from my invention, which resides broadly in the manner of securing the lead pipe to the hard pipe as shown in Fig. 1, and hence I do not limit myself to the exact construction illustrated, but consider myself at liberty to make such changes and alterations as fairly fall within the spirt and scope of the claims.

Having thus described my invention what I claim as new and desire to secure by Letters Patent is:

In a pipe joint, the combination with a hard metal pipe having a cup thereon, and a lead pipe, of a hard metal collar positioned around the lead pipe at a point removed from the end of the latter and having an internal annular groove between its ends, an annular flange on the end of said collar adjacent the end of the lead pipe, said lead pipe pressed annularly within said internal groove in the collar preventing longitudinal movement of the collar on the lead pipe, and then bent at its end around, over, and upon the flange of said collar and positioned in the cup of the first mentioned pipe, packing interposed between said collar and said cup and upon the overlapping portion of the flange, offset pipes on said collar, and said lead pipe forced out against the inner walls of said offset pipes.

In testimony whereof I have signed my name to this specification in the presence of two subscribing witnesses.

DAVID R. BURNS.

Witnesses:
S. W. FOSTER,
ROSE H. KRENKEL.